United States Patent
Caveny et al.

(10) Patent No.: US 7,524,369 B2
(45) Date of Patent: *Apr. 28, 2009

(54) LOW-DENSITY CEMENT COMPOSITIONS, DENSITY-REDUCING ADDITIVES, AND METHODS OF USE

(75) Inventors: William J. Caveny, Rush Springs, OK (US); Michael J. Szymanski, Duncan, OK (US); Richard F. Vargo, Jr., Katy, TX (US); Rickey L. Morgan, Duncan, OK (US); John G. Heaton, Duncan, OK (US); David L. Bolado, Jersey Village, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 410 days.

This patent is subject to a terminal disclaimer.

(21) Appl. No.: 11/053,281

(22) Filed: Feb. 8, 2005

(65) Prior Publication Data

US 2006/0174804 A1   Aug. 10, 2006

(51) Int. Cl.
*C04B 7/00* (2006.01)
*C04B 7/24* (2006.01)
*E21B 33/13* (2006.01)

(52) U.S. Cl. .......... 106/648; 106/654; 106/819; 106/823; 106/655; 106/678; 106/676; 166/292

(58) Field of Classification Search .......... 106/646, 106/672, 676, 654, 819, 823, 648, 655, 678; 166/292

See application file for complete search history.

(56) References Cited

U.S. PATENT DOCUMENTS

| | | | |
|---|---|---|---|
| 3,366,177 A | 1/1968 | Powers et al. | |
| 4,143,202 A * | 3/1979 | Tseng et al. | 428/406 |
| 4,234,344 A | 11/1980 | Tinsley et al. | 106/88 |
| 4,304,298 A | 12/1981 | Sutton | 166/293 |
| 4,340,427 A | 7/1982 | Sutton | 106/87 |
| 4,367,093 A | 1/1983 | Burkhalter et al. | 106/87 |
| 4,450,010 A | 5/1984 | Burkhalter et al. | 106/87 |
| 4,565,578 A | 1/1986 | Sutton et al. | 106/87 |
| 4,761,183 A | 8/1988 | Clarke et al. | 106/117 |
| 4,953,225 A | 8/1990 | Togawa et al. | |
| 5,086,850 A | 2/1992 | Harris et al. | 175/61 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,203 A | 9/1992 | Riley et al. | 252/8.551 |
| 5,435,564 A | 7/1995 | Kennedy et al. | |
| 5,454,867 A | 10/1995 | Brothers et al. | 106/724 |
| 5,484,019 A | 1/1996 | Griffith | 166/293 |
| 5,649,234 A | 7/1997 | Klappert et al. | |
| 5,966,691 A | 10/1999 | Kibre et al. | |
| 6,279,652 B1 | 8/2001 | Chatterji et al. | 166/194 |
| 6,457,524 B1 | 10/2002 | Roddy | 166/293 |
| 6,500,253 B2 | 12/2002 | Norman et al. | 106/726 |
| 6,508,305 B1 | 1/2003 | Brannon et al. | 166/293 |
| 6,516,883 B1 | 2/2003 | Chatterji et al. | 166/293 |
| 6,562,122 B2 | 5/2003 | Dao et al. | 106/705 |
| 6,601,647 B2 | 8/2003 | Brothers et al. | 166/293 |
| 6,631,766 B2 | 10/2003 | Brothers et al. | 166/293 |
| 6,644,405 B2 | 11/2003 | Vijn et al. | 166/293 |
| 6,648,961 B2 | 11/2003 | Brothers et al. | 106/692 |
| 6,648,962 B2 | 11/2003 | Berke et al. | |
| 6,660,078 B2 | 12/2003 | Brothers et al. | 106/705 |
| 6,689,208 B1 | 2/2004 | Brothers | 106/794 |
| 6,744,422 B1 | 6/2004 | Schillings et al. | |
| 6,776,237 B2 | 8/2004 | Dao et al. | 166/292 |
| 6,799,636 B2 | 10/2004 | Funkhouser et al. | 166/293 |
| 6,811,603 B2 | 11/2004 | Brothers et al. | 106/718 |
| 6,814,798 B2 | 11/2004 | Vijn et al. | 106/724 |
| 7,086,466 B2 | 8/2006 | Roddy | |
| 7,341,104 B2 | 3/2008 | Roddy | |
| 7,424,913 B2 | 9/2008 | Roddy | |
| 2004/0033905 A1 * | 2/2004 | Shinbach et al. | 507/100 |
| 2004/0211564 A1 * | 10/2004 | Brothers et al. | 166/293 |
| 2006/0166834 A1 | 7/2006 | Roddy | |
| 2006/0174803 A1 | 8/2006 | Caveny et al. | |

OTHER PUBLICATIONS

JP 80023793 B and Abstract of JP 800023793 B, published Jun. 1980.*

Patent application entitled "Low-Density Cement Compositions, Density-Reducing Additives, and Methods of Use" by William J. Caveny et al., filed Feb. 8, 2005 as U.S. Appl. No. 11/053,302.

Halliburton brochure entitled MicroBond Expanding Additive for Cement Dated 1999.

Halliburton brochure entitled "MicroBond HT Cement Additive" dated 1999.

(Continued)

*Primary Examiner*—Elizabeth D Wood
(74) *Attorney, Agent, or Firm*—Craig W. Roddy; Baker Botts, LLP

(57) ABSTRACT

Methods of using density-reducing additives comprising low-density particulates in subterranean cementing operations are provided. In one embodiment, the present invention provides a method of cementing comprising: providing a cement composition comprising a cement component, a base fluid, and a density-reducing additive comprising particulates that comprise an agglomerating material; placing the cement composition in a location to be cemented; and allowing the cement composition to set therein.

19 Claims, 3 Drawing Sheets

OTHER PUBLICATIONS

Halliburton brochure entitled "MicroBond M Cement Additive" dated 1999.
Halliburton brochure entitled "Micro Fly Ash Cement Component" dated 1999.
Halliburton brochure entitled "Pozmix® Cement Additive" dated 1999.
Halliburton brochure entitled "Silicalite Cement Additive" dated 1999.
Halliburton brochure entitled "Spherelite Cement Additive" dated 1999.
Halliburton brochure entitled "Super CBL Additive Cement Additive" dated 1999.
Halliburton brochure entitled "VersaSet™ Cementing System" dated 1996.
Halliburton brochure entitled "VersaSet Thixotropic Additive" dated 1999.
3M Worldwide brochure entitled "3M Density Reducing Additives for Driling Cements" printed from the internet Feb. 3, 2005.
Paper entitled "The Agglomeration of Cement To Facilitate Transportation" by Huma Hakim, dated 1999.
Office Action from U.S. Appl. No. 11/053,302 dated Jun. 19, 2007.
Office action dated Dec. 7, 2007 from U.S. Appl. No. 11/053,302.
Office Action dated Mar. 6, 2008 from U.S. Appl. No. 11/053,302.
Notice of Allowance from U.S. Appl. No. 11/053,320 dated Sep. 22, 2008.
Non-Final Office Action for U.S. Appl. No. 10/840,894, filed Sep. 11, 2007 (mailing date), Langmacher, et al.
Notice of Allowance and Notice of Allowability for U.S. Appl. No. 11/053,302, dated Dec. 19, 2008.

* cited by examiner

LOW-DENSITY CEMENT COMPOSITIONS, DENSITY-REDUCING ADDITIVES, AND METHODS OF USE

CROSS REFERENCE TO RELATED APPLICATIONS

This application is related to U.S. patent application Ser. No. 11/053,302, entitled "Low-Density Cement Compositions, Density-Reducing Additives, And Methods of Use," filed concurrently with this application.

BACKGROUND

The present invention relates to subterranean cementing operations, and more particularly, to improved additives comprising low-density particulates, and methods of use.

Hydraulic cement compositions commonly are utilized in subterranean operations, particularly subterranean well completion and remedial operations. For example, hydraulic cement compositions often may be used in primary cementing operations whereby pipe strings, such as casings and liners, are cemented in well bores. In performing primary cementing, hydraulic cement compositions may be placed within an annular space between the walls of a well bore and the exterior surface of a pipe string disposed therein. The cement composition is permitted to set in the annular space, thereby forming therein an annular sheath of hardened substantially impermeable cement that supports and positions the pipe string in the well bore, and that bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

Subterranean formations transversed by well bores often may be weak and extensively fractured. In some cases, a formation may be unable to withstand the hydrostatic pressure normally associated with the placement of cement compositions in the formation. In such cases, the hydrostatic pressure may force a cement composition to go undesirably deep into fractures in the formation, which may result in a significant loss of cement composition into the formation during cementing operations. The problem may be referred to as "lost circulation" of the cement composition. This loss of cement composition is problematic because the amount of cement composition that may remain in the annular space may be inadequate to sufficiently bond the exterior surfaces of the pipe string to the walls of the well bore.

Conventional attempts to solve the problem of lost circulation commonly have involved lightening the density of the cement composition, so as, inter alia, to, reduce the hydrostatic pressure to which the formation may be exposed during cementing operations. A traditional means of reducing the density of the cement composition has been to increase the cement composition's water content, because, generally speaking, increasing the concentration of water in a cement composition decreases the cement composition's density. However, this method may be problematic because it may increase the time required for the cement composition to cure, and may result in a cement composition that may lack the desired strength and mechanical properties.

Another alternative means that has been employed to reduce the density of cement compositions has involved the addition to the cement composition of lightweight particulates. Lightweight particulates that conventionally have been used include, inter alia, hollow spheres (e.g., cenospheres, glass hollow spheres, or ceramic hollow spheres). However, the use of conventional hollow spheres has been problematic. Conventional hollow spheres may become poorly dispersed within the cement composition, which may cause the conventional hollow spheres to congregate at shallower depths in the formation, and thus may relegate higher-density portions of the nonhomogenous cement composition to greater depths in the formation, where they may continue to be lost into the formation. Conventionally, great care often must be taken in formulating cement compositions comprising hollow spheres, and in maintaining the viscosity of such cement compositions, so as to prevent the separation and segregation of the conventional hollow spheres, apart from the bulk of the cement composition. This may result in added expense due to, among other things, a need for additional additives and monitoring.

SUMMARY

The present invention relates to subterranean cementing operations, and more particularly, to improved additives comprising low-density particulates, and methods of use.

In one embodiment, the present invention provides a method of cementing comprising: providing a cement composition comprising a cement component, a base fluid, and a density-reducing additive comprising particulates that comprise an agglomerating material; placing the cement composition in a location to be cemented; and allowing the cement composition to set therein.

In another embodiment, the present invention provides a method of reducing the density of a cement composition comprising adding to the cement composition a density-reducing additive comprising particulates that comprise an agglomerating material.

In another embodiment, the present invention provides a method of making a density-reducing additive comprising the steps of: providing particulate material; cooling the particulate material; exposing the particulate material to a gas above the temperature of the particulate material; and combining the particulate material with an agglomerating material so as to cause at least a portion of the agglomerating material to adhere to at least a portion of the particulate material.

The features and advantages of the present invention will be readily apparent to those skilled in the art upon a reading of the description of the embodiments that follows.

DRAWINGS OF EXEMPLARY EMBODIMENTS

The following drawings form part of the present specification and are included to further demonstrate certain aspects of the present invention. The invention may be better understood by reference to one or more of these drawings in combination with the description of embodiments presented herein. In no way should these figures be used to limit the scope of the claims.

Figure 1:
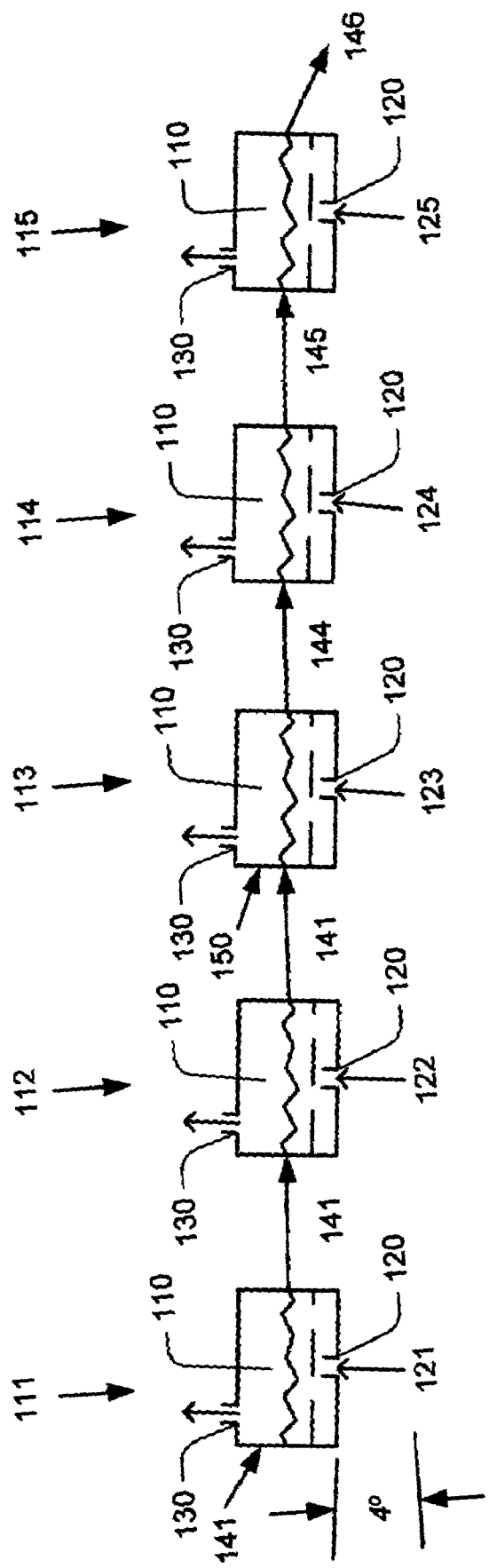
FIG. 1 illustrates one embodiment of a method of making certain embodiments of the density-reducing additives of the present invention.

While the present invention is susceptible to various modifications and alternative forms, specific exemplary embodiments thereof have been shown in the drawings and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The present invention relates to subterranean cementing operations, and more particularly, to improved additives comprising low-density particulates, and methods of use.

Figure 3A:
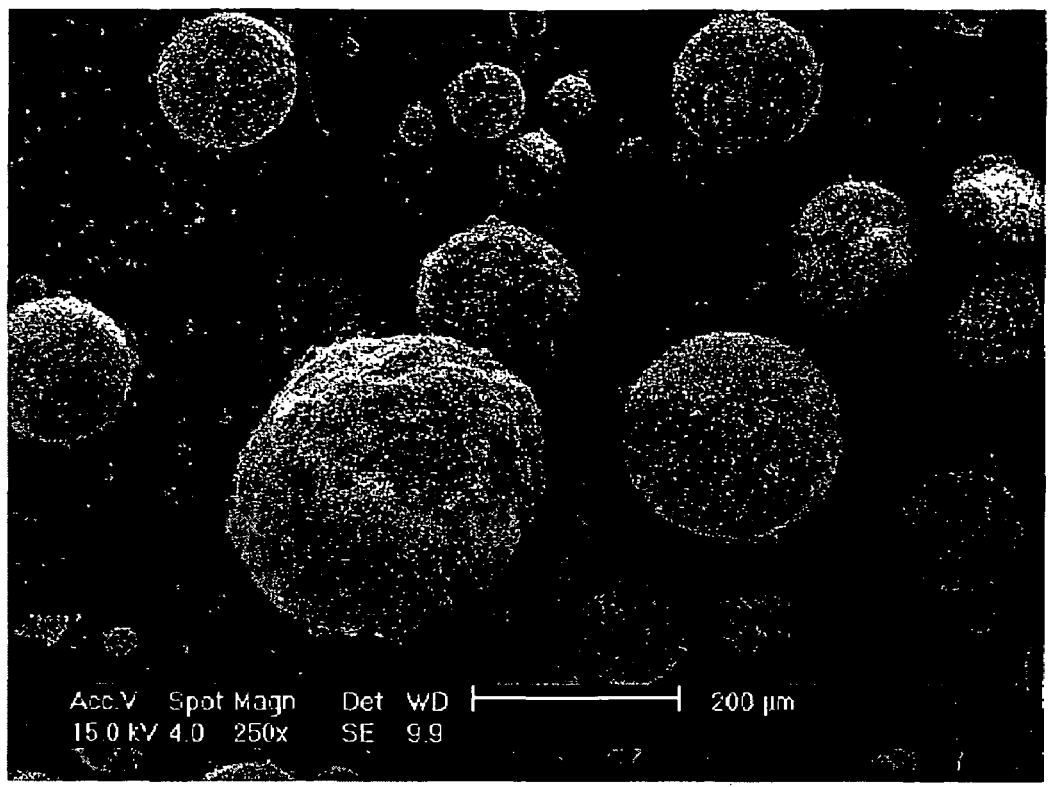
FIGS. 3A and 3B are magnified photographs of certain embodiments of the density-reducing additives of the present invention.
Figure 3B:
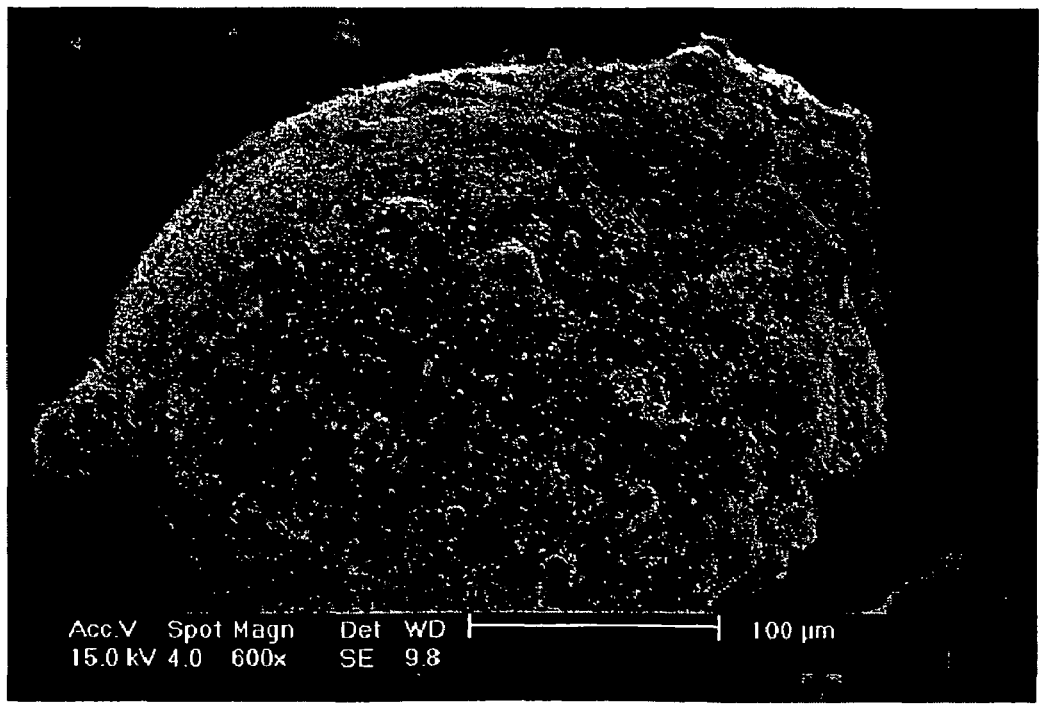

The cement compositions of the present invention comprise a cement component, a base fluid, and density-reducing additives of the present invention. The density-reducing additives of the present invention comprise particulates that comprise an agglomerating material attached to the surface of the particulates. Magnified photographs of samples of these density-reducing additives are shown in FIGS. 3A and 3B. In some embodiments, the surfaces of the particulates of the density-reducing additives of the present invention may be substantially covered by the agglomerating material; in other embodiments, agglomerating material may be attached only to some portion of the surfaces of the particulates. Generally, the density-reducing additives of the present invention have a specific gravity in the range of from about 0.6 to about 2.0. The density-reducing additives of the present invention may exhibit such properties as, among other things, increased durability. Furthermore, an increased coefficient of friction between the density-reducing additives of the present invention may result (as compared to the coefficient of friction that may be observed between, for example, conventional hollow spheres). Additionally, the density-reducing additives of the present invention may bond more strongly with the cement in the cement composition (as compared, for example, to the bonding that may be observed between the cement and conventional hollow spheres).

Generally, the density-reducing additives of the present invention will be present in the cement compositions of the present invention in an amount sufficient to reduce the density of the cement composition by a desired amount. In certain embodiments, the density-reducing additives of the present invention may be present in the cement compositions of the present invention in an amount in the range of from about 1% to about 300% by weight of the cement component ("bwoc"). In certain exemplary embodiments, the density-reducing additives of the present invention may be present in the cement compositions of the present invention in an amount in the range of from about 5% to about 100% bwoc.

Any particulate that is capable of withstanding the rigors of being pumped into a subterranean annulus may be suitable for use in the density-reducing additives of the present invention. Certain embodiments of the particulates utilized in the present invention may be spherical or substantially spherical. Suitable particulates include, inter alia, hollow spheres (e.g., cenospheres, glass hollow spheres, or ceramic hollow spheres). Commercially available examples of suitable hollow particulates include those that are commercially available from Halliburton Energy Services, Inc., under the trade name "SPHERELITE™". Generally, the particulates have a specific gravity in the range of from about 0.6 to about 1.0. In certain embodiments, the particulates may be present in the density-reducing additives of the present invention in an amount in the range of from about 50% to about 99% by weight of the density-reducing additives of the present invention.

A variety of materials may be suitable for use as agglomerating materials in the density-reducing additives of the present invention. Generally, the agglomerating material may be any substance with a specific gravity above about 1.0 that readily will adhere to the surface of the particulates and will not adversely affect the performance of the cement in the cement compositions of the present invention. Individuals skilled in the art, with the benefit of this disclosure, will recognize suitable types of agglomerating materials. In certain embodiments of the present invention, the agglomerating material may comprise a cementitious material. The cementitious material may comprise particles of any known cement, including, but not limited to, particles of hydraulic cements composed of calcium, aluminum, silicon, oxygen, and/or sulfur, which set and harden by reaction with a base fluid. Examples of hydraulic cements that may be suitable for use as agglomerating materials include, but are not limited to, Portland cements, pozzolana cements, gypsum cements, high alumina content cements, silica cements, calcium sulfate hemihydrate, high alkalinity cements, and the like. In certain embodiments, the cementitious material may be a Type III Portland cement having a Blaine fineness of about 10,000. Commercially available examples of suitable cementitious materials include those that are available from Halliburton Energy Services, Inc., of Duncan, Okla., under the trade name "MICRO MATRIX™." In certain embodiments of the present invention, the agglomerating material may comprise a latex. Generally, the agglomerating material should be present in the density-reducing additives of the present invention in an amount that desirably reduces the tendency for the particulates in the density-reducing additive to separate from other components of the cement composition. In certain embodiments, the agglomerating material may be present in the density-reducing additives of the present invention in an amount in the range of from about 1% to about 50% by weight of the particulates. In certain exemplary embodiments, the agglomerating material may be present in the density-reducing additives of the present invention in an amount in the range of from about 15% to about 25% by weight of the particulates.

The agglomerating material may be combined with the particulates in a variety of ways. In certain embodiments of the present invention, the agglomerating material may be combined with the particulates as follows. First, suitable particulates may be cooled to a temperature that is below the dew point temperature of the ambient environment, the final cooled temperature being in the range of from about −160° F. to about 150° F. In certain embodiments, the particulates may be cooled to a temperature in the range of from about −20° F. to about 40° F. Next, the particulates may be conditioned by exposing them to a gas at a temperature above that of the particulates. In certain embodiments, the gas may be saturated air. During conditioning, moisture will condense on the surfaces of at least a portion of the particulates. After conditioning, the agglomerating materials may be added to the particulates, and the mixture of particulates and agglomerating materials then may be thoroughly agitated by, or in the presence of, a gas at a temperature above that of the particulates. During agitation, at least a portion of the agglomerating material will contact the surfaces of the particulates, thereby adhering to the surfaces of the particulates in the mixture. After the agglomerating material has been combined with the particulates, the mixture may be heated to a temperature that is above the dew point temperature of the ambient environment, the final heated temperature being in the range of from about 32° F. to about 400° F. In certain exemplary embodiments, the mixture may be heated at a temperature in the range of from about 150° F. to about 320° F. Upon conclusion of the heating step, density-reducing additives of the present invention are produced, which then may be cooled to a desired temperature, e.g., to room temperature.

In certain embodiments of the present invention, the preparation of the density-reducing additives of the present invention may involve the use of a series of fluidized beds, or a single partitioned fluidized bed system. Referring now to FIG. 1, which illustrates an exemplary embodiment of a suitable system, each of the fluidized bed reactors 110 in the system has an inflow gas valve 120 and an outflow gas vent 130. Initially, the particulates 141 are cooled by injecting a gas 121 at a temperature below the ambient temperature into the reactor 111. The particulates 141 are then transferred to the next reactor or partition 112, where a warm saturated gas 122 is injected into the reactor 112, thereby causing condensation to form on the surfaces of the particulates 141. The agglomerating material 150 is then combined with the particulates 141 in the next partition or reactor 113, and the mixture is agitated by the inflow of warm saturated gas 123. Once sufficiently mixed, the mixture 144 is moved into the next reactor or partition 114 where a hot, dry gas 124 is injected, causing the agglomerating material to set. Finally, the particulates contacted by agglomerating material 145 may be cooled back to about ambient temperature in a final reactor or partition 115 injected with a cool, dry gas 125. The finished product 146 then may be transferred out of the system for storage.

Figure 2:
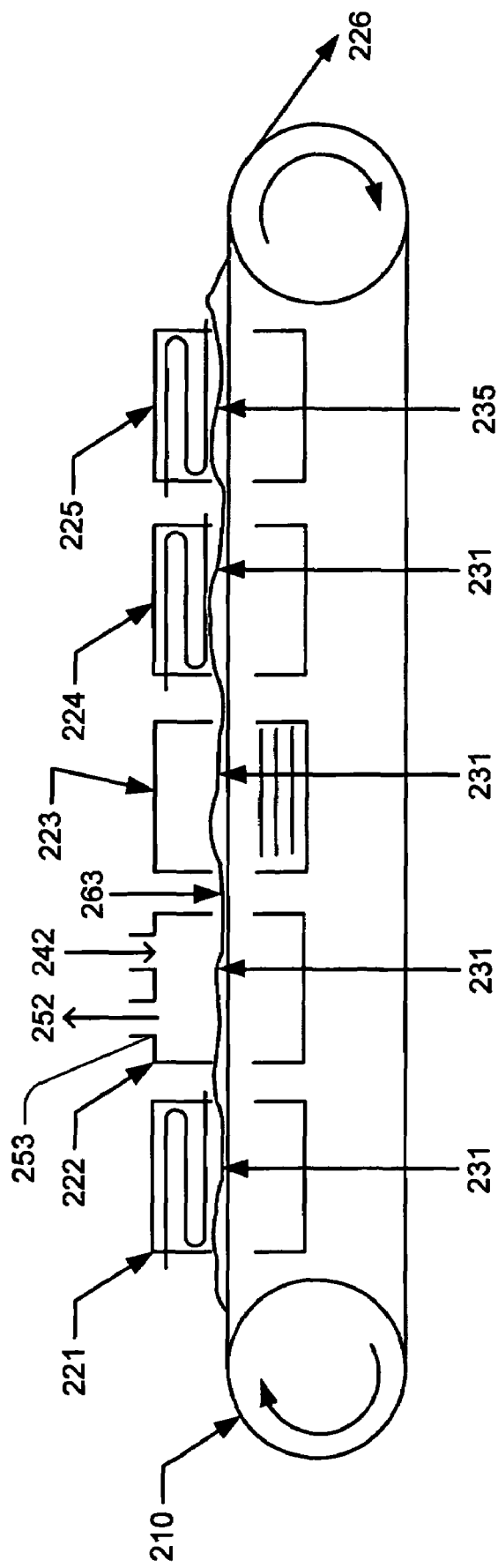
FIG. 2 illustrates another embodiment of a method of making certain embodiments of the density-reducing additives of the present invention.

In certain embodiments of the present invention, the preparation of the density-reducing additives of the present invention may involve a system of containers on a mechanical conveyor that moves the particulates and agglomerating material through the system. Referring now to FIG. 2, which illustrates an exemplary embodiment of a suitable system, the mechanical conveyor 210 may comprise a rotating belt or chain, a drag system, or a vibratory conveyor. In the initial container 221, the particulates 231 are cooled to a temperature below ambient temperature. In the next container 222, the cooled particulates 231 are conditioned by being exposed to a warm saturated gas 242, thereby causing condensation to form on the surfaces of the cooled particulates 231. The container 222 also may have a gas vent 253 for the outflow of excess gas 252. The agglomerating material 263 is then added to the particulates 231, and the mixture is then agitated in the next container 223 so as to mix the agglomerating material 263 with the particulates 231. After agitation, the mechanical conveyor 210 moves the particulates 231 through a heating oven 224 at a particular rate of speed, causing the agglomerating material contacting the surfaces of the particulates 231 to set to form the density-reducing additives of the present invention 235. The mechanical conveyor 210 then moves the density-reducing additives of the present invention 235 to a final container 225 where they may be cooled to about ambient temperature. The finished product 226 is then transferred out of the system for storage.

In addition to comprising density-reducing additives of the present invention, the cement compositions of the present invention further comprise a cement component. The cement component in the cement compositions of the present invention may comprise any known cement, including hydraulic cements composed of calcium, aluminum, silicon, oxygen, and/or sulfur, which set and harden by reaction with water. Examples of suitable hydraulic cements include, but are not limited to, Portland cements, pozzolana cements, gypsum cements, high alumina content cements, silica cements, and high alkalinity cements.

The base fluid utilized in the cement compositions of the present invention may be aqueous-based or non-aqueous-based, or a mixture thereof. Where the base fluid is aqueous-based, it may comprise fresh water, salt water (e.g., water containing one or more salts dissolved therein), brine (e.g., saturated salt water), or seawater. Generally, the water can be from any source, provided that it does not contain an excess of compounds that may adversely affect other components in the cement composition. Where the base fluid is non-aqueous-based, the base fluid may comprise any number of organic liquids. Examples of suitable organic liquids include, but are not limited to, mineral oils, synthetic oils, esters, and the like. Generally, any organic liquid in which a water solution of salts can be emulsified is suitable for use as a base fluid in the cement compositions of the present invention. The base fluid may be present in an amount sufficient to form a pumpable slurry. More particularly, in certain embodiments, the base fluid may be present in the cement compositions in an amount in the range of from about 30% to about 200% bwoc. In certain preferred embodiments, the base fluid may be present in the cement compositions in the range of from about 38% to about 120% bwoc.

Optionally, the cement compositions of the present invention may comprise an expanding additive, for providing a foamed cement composition. The expanding additive may be any component suitable for performing the desired function of incorporating gas into the cement composition. Further, foaming of the cement composition can be accomplished by any suitable method. Where the expanding additive is a gas, for instance, foaming of the cement composition may be achieved at the surface in one preferred embodiment, and the foamed cement composition then may be introduced into the subterranean formation and permitted to set therein. Where the cement compositions of the present invention are to be foamed, the cement compositions may be foamed in one preferred embodiment by direct injection of the expanding additive into the cement composition. For instance, where the cement composition is foamed by the direct injection of gas into the composition, the gas utilized can be air or any suitable inert gas, such as nitrogen, or even a mixture of such gases. Preferably, nitrogen is used. Where foaming is achieved by direct injection of gas, the gas may be present in the composition in an amount sufficient to foam the composition, generally in an amount in the range of from about 0.01% to about 60% by volume of the composition. In another preferred embodiment, the cement composition is foamed by gas generated by a reaction between the cement slurry and an expanding additive present in the cement composition in particulate form. For example, the composition may be foamed by hydrogen gas generated in situ as the product of a reaction between the slurry and fine aluminum powder present in the cement composition. Where an expanding additive in particulate form is used, aluminum powder, gypsum blends, and deadburned magnesium oxide are preferred. Preferred expanding additives comprising aluminum powder are commercially available under the trade names "GAS-CHEK®" and "SUPER CBL™" from Halliburton Energy Services of Duncan, Okla.; a preferred expanding additive comprising a blend containing gypsum is commercially available under the trade name "MICROBOND™" from Halliburton Energy Services of Duncan, Okla.; and preferred expanding additives comprising deadburned magnesium oxide are commercially available under the trade names "MICROBOND M™" and "MICROBOND HT™" from Halliburton Energy Services, Inc., of Duncan, Okla. Such preferred expanding additives are described in commonly-owned U.S. Pat. Nos. 4,304,298;

4,340,427; 4,367,093; 4,450,010; and 4,565,578, the relevant disclosures of which are hereby incorporated herein by reference.

Additional additives may be added to the cement compositions of the present invention as deemed appropriate by one skilled in the art with the benefit of this disclosure. Examples of such additives include, among other things, fluid loss control additives, salts, vitrified shale, fly ash, fumed silica, bentonite, set retarders, viscosifiers, and the like. An example of a suitable fly ash is "POZMIX® A," commercially available from Halliburton Energy Services, Inc., of Duncan, Okla. An example of a suitable source of fumed silica is "SILICALITE™," commercially available from Halliburton Energy Services, Inc., of Duncan, Okla. An example of a suitable viscosifier is "VERSASET™," commercially available from Halliburton Energy Services, Inc., of Duncan, Okla.

In one embodiment, the present invention provides a method of cementing comprising: providing a cement composition comprising a cement component, a base fluid, and a density-reducing additive comprising particulates that comprise an agglomerating material; placing the cement composition in a location to be cemented; and allowing the cement composition to set therein. Examples of locations that may be cemented utilizing the methods and compositions of the present invention include, inter alia, subterranean formations penetrated by a well bore. The methods of the present invention also may be used by placing cement compositions of the present invention in certain locations in constructing cement structures (e.g., concrete barriers, docks, piers, floating platforms, pilings, roads, walls, slabs, roofs, and floors) with increased buoyancy, reduced weight, or reduced thermal conductivity. For example, structures with these properties may be desired where they are constructed on, among other things, marshlands, tundra, or frozen surfaces. The methods of the present invention also may be used in placing cement compositions of the present invention in certain locations so as to insulate, among other things, pipelines or other structures that are underground, underwater, or in other environments where their internal temperature must be maintained.

In another embodiment, the present invention provides a method of reducing the density of a cement composition comprising adding to the cement composition a density-reducing additive comprising particulates that comprise an agglomerating material.

In another embodiment, the present invention provides a method of making a density-reducing additive comprising the steps of: providing particulate material; cooling the particulate material; exposing the particulate material to a gas above the temperature of the particulate material; and combining the particulate material with an agglomerating material so as to cause at least a portion of the agglomerating material to adhere to at least a portion of the particulate material.

To facilitate a better understanding of the present invention, the following examples of specific embodiments are given. In no way should the following examples be read to limit or define the entire scope of the invention.

EXAMPLE

A laboratory sample of a cement composition of the present invention was prepared. First, SPHERELITE™ particulates were placed under 6,000 pounds of pressure, and the particles that cracked under that pressure were discarded. Next, the dry mix of the composition comprised 88% Premium Cement (Class H) and 12% POZMIX® A. To the dry mix, the following components were added: SILICALITE™ in an amount of 7.8% by weight of the dry mix; and VERSASET™ in an amount of 0.3% by weight of the dry mix. Water then was added in an amount of 127% by weight of the dry mix to form a slurry, and the slurry then was mixed in a blender at 15,000 RPM for 35 seconds. Finally, the uncracked particulates of SPHERELITE™ were blended into the slurry with a spatula (in an amount of 14.5% by weight of the dry mix). The cement composition had a weight of 11.5 pounds per gallon.

Therefore, the present invention is well adapted to carry out the objects and attain the ends and advantages mentioned as well as those which are inherent therein. While the invention has been depicted, and described by reference to embodiments of the present invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the present invention are exemplary only, and are not exhaustive of the scope of the present invention. Consequently, the invention is intended to be limited only by the spirit and scope of the appended claims, giving full cognizance to equivalents in all respects.

What is claimed is:

1. A method of cementing comprising:
   providing a cement composition comprising a cement component, a base fluid, and a density-reducing additive comprising at least one particulate that comprises fly ash and an agglomerating material that comprises a cement;
   placing the cement composition in a location to be cemented; and
   allowing the cement composition to set therein.

2. The method of claim 1 wherein the particulates are spherical or substantially spherical.

3. The method of claim 1 wherein the agglomerating material comprises at least one agglomerating material selected from the group consisting of: a cement comprising calcium; a cement comprising aluminum; a cement comprising silicon; a cement comprising oxygen; a cement comprising sulfur; and any combination thereof.

4. The method of claim 1 wherein the agglomerating material comprises at least one agglomerating material selected from the group consisting of: Portland cement; pozzolana cement; gypsum cement; high alumina content cement; silica cement; high alkalinity cement; and any combination thereof.

5. The method of claim 1 wherein the agglomerating material further comprises a latex.

6. The method of claim 1 wherein the agglomerating material is present in the density-reducing additive in an amount in the range of from about 1% to about 50% by weight of the particulates.

7. The method of claim 1 wherein the specific gravity of the density-reducing additive is in the range of from about 0.6 to about 2.0.

8. The method of claim 1 wherein the particulates comprise at least one particulate selected from the group consisting of: a hollow sphere, a cenosphere, a ceramic hollow sphere, any derivative thereof, and any combination thereof.

9. A method of making a density-reducing additive comprising the steps of:
   providing particulate material;
   cooling the particulate material;
   exposing the particulate material to a gas above the temperature of the particulate material; and combining the particulate material with an agglomerating material so as to cause at least a portion of the agglomerating material to adhere to at least a portion of the particulate material.

10. A density-reducing additive made by the method of claim 9 wherein the agglomerating material is selected from the group consisting of: Portland cement; pozzolana cement; gypsum cement; high alumina content cement; silica cement; high alkalinity cement; and any combination thereof.

11. The method of claim 9 wherein the particulate material comprises at least one particulate material selected from the group consisting of: a hollow sphere, a cenosphere, a glass hollow sphere, a ceramic hollow sphere, any derivative thereof, and any combination thereof.

12. A method of cementing in a subterranean formation comprising:

providing a cement composition comprising a cement component, a base fluid, and a density-reducing additive comprising at least one particulate and an agglomerating material;

placing the cement composition in at least a portion of a subterranean formation; and allowing the cement composition to set therein.

13. The method of claim 12 wherein the particulate is spherical or substantially spherical.

14. The method of claim 12 wherein the agglomerating material comprises a cement.

15. The method of claim 12 wherein the agglomerating material comprises at least one agglomerating material selected from the group consisting of: a cement comprising calcium; a cement comprising aluminum; a cement comprising silicon; a cement comprising oxygen; a cement comprising sulfur; and any combination thereof.

16. The method of claim 12 wherein the agglomerating material comprises at least one agglomerating material selected from the group consisting of: Portland cement; pozzolana cement; gypsum cement; high alumina content cement; silica cement; high alkalinity cement; and any combination thereof.

17. The method of claim 12 wherein the agglomerating material is present in the density-reducing additive in an amount in the range of from about 1% to about 50% by weight of the particulates.

18. The method of claim 12 wherein the specific gravity of the density-reducing additive is in the range of from about 0.6 to about 2.0.

19. The method of claim 12 wherein the particulates comprise at least one particulate selected from the group consisting of: a hollow sphere, a cenosphere, a glass hollow sphere, a ceramic hollow sphere, any derivative thereof, and any combination thereof.

* * * * *